No. 679,628. Patented July 30, 1901.
J. F. LEHMANN.
DETACHABLE BASE FOR MEASURING GLASSES.
(Application filed May 7, 1900.)
(No Model.)
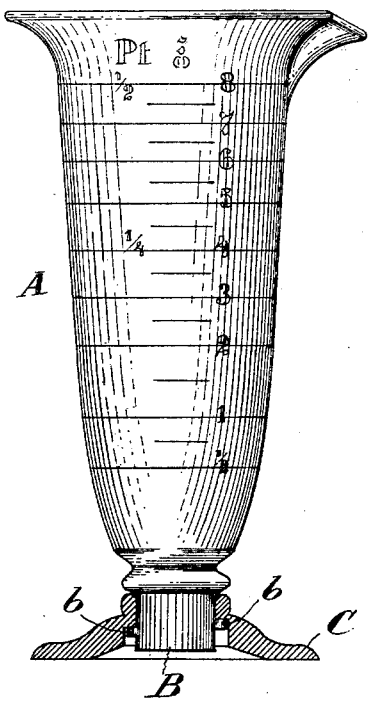
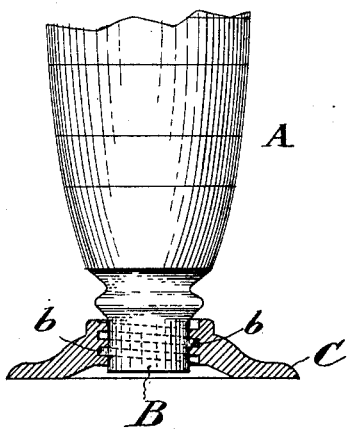
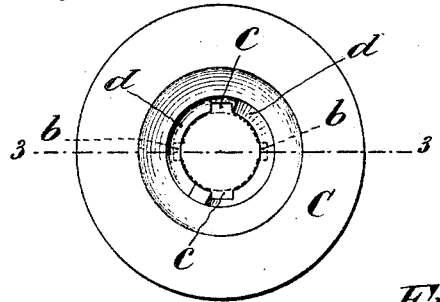
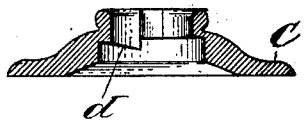
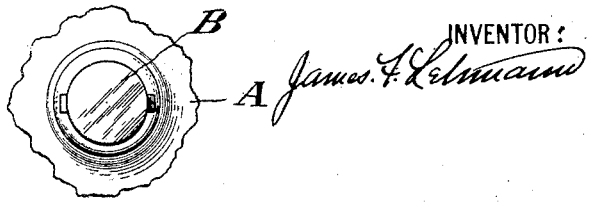
WITNESSES: INVENTOR:

UNITED STATES PATENT OFFICE.

JAMES F. LEHMANN, OF NEW YORK, N. Y.

DETACHABLE BASE FOR MEASURING-GLASSES.

SPECIFICATION forming part of Letters Patent No. 679,628, dated July 30, 1901.

Application filed May 7, 1900. Serial No. 15,665. (No model.)

*To all whom it may concern:*

Be it known that I, JAMES F. LEHMANN, a citizen of the United States, and a resident of New York, borough of Manhattan, county and State of New York, have invented a certain new and useful Detachable Base for Graduated Measuring-Glasses, of which the following is a specification.

This invention relates to graduated measuring-glasses made use of by druggists in obtaining the required quantity of fluid ingredients in compounding prescriptions.

Ordinarily graduated measuring-glasses are made with the foot or supporting-base formed of glass and integral with the receptacle. The glass foot or base is quite liable to be broken in the use of the receptacle, and hence it has been found advantageous to make the supporting-base of material other than glass and to provide means for its attachment to the bottom of the receptacle.

The object of the present invention is to provide the stem at the bottom of a graduated measuring-glass with simple and efficient means for attaching thereto a supporting-base, which may be of hard rubber or any other suitable material, the said base being of such construction as regards its attaching means as to adapt it to be quickly applied and removed from the receptacle and to be held in place on the stem of the receptacle in such manner that the measuring-glass will be supported in an accurately perpendicular position.

In the accompanying drawings, Figure 1 is a view in elevation of the measuring-glass with its base (which is in sections) in position. Fig. 2 is a plan view of the base, showing the stem at the bottom of the measuring-glass in dotted lines. Fig. 3 is a section on the line 3 3 of Fig. 2. Fig. 4 is a bottom view of Fig. 1 with the base omitted; and Fig. 5 shows in elevation the lower portion of the receptacle, including the stem at the bottom, to which is secured a base (shown in section) which is provided with screw-thread attaching means.

In the drawings, A indicates the measuring-glass, which is provided at its bottom with the stem B, cylindrical in form. The stem B has formed integrally therewith the two lugs $b\ b$ on different horizontal planes, as shown.

The base for the receptacle is indicated by C and may be of hard rubber or any other suitable material. This base is provided with a central opening, as shown, having in its edge the two opposite notches $c\ c$. Extending from these notches in opposite directions are the curved inclined surfaces $d\ d$. (See Fig. 2.) The base C is attached to the stem B by bringing the notches $c\ c$ of the base coincident with the lugs $b\ b$ on the stem, and then by passing said lugs through said notches and giving the base a slight turn the lugs will ride up on the curved inclined surfaces $d\ d$ and lock the base to the stem.

In Fig. 5 the base C is shown provided on its inner surface with screw-threads instead of being of the construction above described. A screw-threaded base is adapted to be attached to the stem B, having lugs $b$, when there is a proper correspondence between the positions of the lugs on the stem and the pitch of the threads.

Having thus described my invention, what I claim as new, and desire to secure by Letters Patent, is—

The combination of a graduated measuring-glass provided at its lower end with a stem portion, provided upon diametrically opposite sides with offset lugs lying in different horizontal planes, and a separate detachable supporting-base provided with a central opening receiving said stem and with wedging inclines adapted to be engaged by the oppositely-located lugs.

Signed at New York, borough of Manhattan, county and State of New York, this 5th day of May, 1900.

JAMES F. LEHMANN.

Witnesses:
M. C. PINCKNEY,
J. E. M. BOWEN.